United States Patent
Inoue

(10) Patent No.: US 9,062,598 B2
(45) Date of Patent: Jun. 23, 2015

(54) INTERNAL COMBUSTION ENGINE OPERABLE IN HOMOGENEOUS-CHARGE COMPRESSION MODE

(71) Applicant: Suzuki Motor Corporation, Shizuoka (JP)

(72) Inventor: Hiroaki Inoue, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 272 days.

(21) Appl. No.: 13/652,519

(22) Filed: Oct. 16, 2012

(65) Prior Publication Data

US 2013/0104840 A1    May 2, 2013

(30) Foreign Application Priority Data

Oct. 31, 2011    (JP) ................. 2011-239475

(51) Int. Cl.
*F02D 13/04* (2006.01)
*F02B 47/08* (2006.01)
(Continued)

(52) U.S. Cl.
CPC .............. *F02B 47/08* (2013.01); *Y02T 10/121* (2013.01); *Y02T 10/128* (2013.01); *F02M 25/0751* (2013.01); *F02D 13/0276* (2013.01); *Y02T 10/18* (2013.01)

(58) Field of Classification Search
CPC ............ F01L 2013/10; F01L 2800/00; F02D 2041/001; F02M 25/0707
USPC ........... 123/321–323, 345–348, 90.15, 90.16, 123/676, 568.11, 568.14
See application file for complete search history.

(56) References Cited

U.S. PATENT DOCUMENTS

| 7,168,420 | B1 * | 1/2007 | Yang | 123/568.15 |
| 7,213,572 | B2 * | 5/2007 | Yang | 123/406.11 |
| 7,234,438 | B2 * | 6/2007 | Yang | 123/295 |

(Continued)

FOREIGN PATENT DOCUMENTS

| CN | 101413451 A | 4/2009 |
| JP | 2001-3800 A | 1/2001 |

(Continued)

OTHER PUBLICATIONS

Notification of First Office Action mailed Jun. 5, 2014 in corresponding Chinese Patent Application No. 201210428908.3 (with an English translation) (13 pages).

(Continued)

*Primary Examiner* — John Kwon
(74) *Attorney, Agent, or Firm* — Rothwell, Figg, Ernst & Manbeck, P.C.

(57) ABSTRACT

In an internal combustion engine, a valve actuating mechanism actuates an intake valve member to open an intake port, and actuates an exhaust valve member to return a first part of exhaust gas with a high-temperature from a gas exhaust passage into a combustion chamber via an exhaust port. A cooling and recirculation system recirculates a second part of the exhaust gas from the gas exhaust passage into the gas intake passage via a recirculation passage while cooling the second part of the exhaust gas. This results in a stratified temperature distribution of a high-temperature mixture of first fresh air and the first part of the exhaust gas with the high temperature and a low-temperature mixture of second fresh air and the second part of the exhaust gas with a low temperature in the combustion chamber.

4 Claims, 10 Drawing Sheets

(51) Int. Cl.
*F02M 25/07* (2006.01)
*F02D 13/02* (2006.01)

(56) References Cited

U.S. PATENT DOCUMENTS

| | | |
|---|---|---|
| 2001/0006054 A1 | 7/2001 | Yoshizawa et al. |
| 2007/0233354 A1* | 10/2007 | Yang .............................. 701/104 |
| 2009/0125213 A1 | 5/2009 | Kuzuyama |
| 2012/0125289 A1 | 5/2012 | Mori |

FOREIGN PATENT DOCUMENTS

| | | |
|---|---|---|
| JP | 2001-152908 A | 6/2001 |
| JP | 2001-164979 A | 6/2001 |
| JP | 2001-214741 A | 8/2001 |
| WO | 2011/016136 A1 | 2/2011 |

OTHER PUBLICATIONS

Notification of Second Office Action mailed Feb. 25, 2015 in corresponding Chinese Patent Application No. 201210428908.3 (with an English translation) (15 pages).

* cited by examiner

F I G. 7
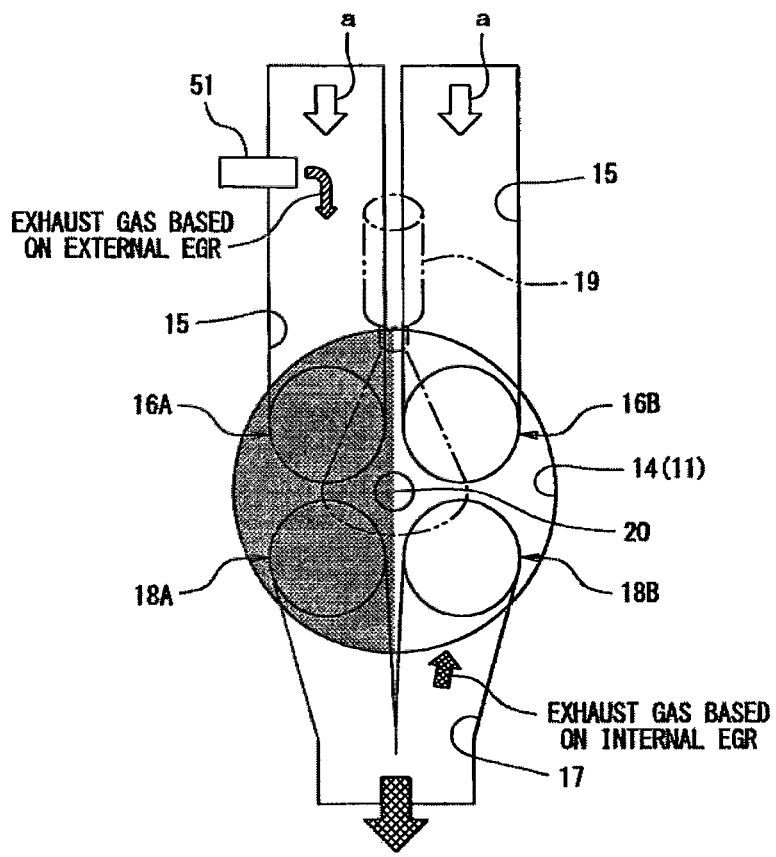

INTERNAL COMBUSTION ENGINE OPERABLE IN HOMOGENEOUS-CHARGE COMPRESSION MODE

CROSS REFERENCE TO RELATED APPLICATIONS

This application is based on and claims the benefit of priority from Japanese Patent Application 2011-239475 filed on Oct. 31, 2011, the disclosure of which is incorporated in its entirety by reference.

TECHNICAL FIELD

The present invention relates to internal combustion engines, and more particularly to such internal combustion engines capable of operating switchably in a spark-ignition mode and a homogeneous-charge compression ignition mode according to their operating ranges in terms of engine speed and load.

BACKGROUND

Internal combustion engines, which use homogeneous-charge compression ignition (HCCI) in addition to spark ignition (SI), have been proposed. HCCI is a form of internal combustion in which a homogeneous charge of air-fuel mixture is compressed in a combustion chamber to start ignition, and SI is a form of internal combustion in which combustion begins when air-fuel mixture in a combustion chamber is ignited by a spark. In HCCI, combustion occurs at a lower temperature in comparison to spark ignition, resulting in low Nitrogen oxide (NOx) emissions. HCCI has another characteristic of high thermal efficiency, which achieves extremely low levels of $CO_2$ emissions. In HCCI, because auto-ignition occurs without external ignition-timing control means, such as spark plugs, the timing of ignition is determined based on complicated auto-ignition process. Thus, in HCCI, it is difficult to control the timing of ignition. Particularly, if engines operated in an HCCI mode with high load, abrupt increase in pressure in their combustion chambers due to knocking or sudden increase in pressure could cause noise. Thus, the operating ranges of known engines in terms of load in the HCCI mode are limited at high load.

One type of known engines with HCCI function is designed to use internal EGR (Exhaust Gas Recirculation). This type of engines controls intake and exhaust valve overlap during which exhaust gas with a high temperature is recirculated via the exhaust port into the combustion chamber, so that stratification of fresh intake air and the recirculated exhaust gas is created in the combustion chamber. Another type of known engines with HCCI function is designed to use external EGR. This type of engines is equipped with an external pipe connecting the exhaust port to the intake port, an example of which is disclosed in Japanese Patent Application Publication No. 2001-214741. An internal combustion engine based on the external EGR is designed to feed exhaust gas with a relatively high temperature back through the external pipe into the combustion chamber via the intake port, so that stratification of fresh intake air and the recirculated exhaust gas is generated in the combustion chamber. In these engines with internal or external EGR, the stratification of intake air and the recirculated exhaust gas facilitates reduction in fuel burning velocity.

SUMMARY

As described above, internal combustion engines, which operate in the HCCI mode, use the internal EGR or the external EGR to create stratified fresh intake air and recirculated exhaust gas in the combustion chamber, resulting in a limit on an increase in fuel-mixture burning velocity.

However, in these internal combustion engines, the recirculated exhaust-gas region in the combustion chamber may remain high in temperature, resulting in a high level of the ignitability in the recirculated exhaust-gas region in the combustion chamber. A large amount of oxygen in the intake-air region, that is, fresh-air region in the combustion chamber may result in a high level of the ignitability in the intake-air region in the combustion chamber. The high ignitability in the combustion chamber may interfere with slowdown in fuel-mixture combustion. In addition, in the known internal combustion engines, recirculated exhaust gas with a high temperature being draw back in the combustion chamber may increase combustion temperature of a relatively concentrated charge, that is, a relatively rich air-fuel mixture, resulting in generation and exhaust of NOx emissions. Thus, these known internal combustion engines may not achieve one of the most advantages, which HCCI function can obtain, of little NOx emissions.

In view of the circumstances set forth above, one aspect of the present invention seeks to provide internal combustion engines designed to address at least one of the problems set forth above.

Specifically, an alternative aspect of the present invention aims to provide such internal combustion engines, which are capable of at least one of: expanding their operating ranges in HCCI mode in their total operating ranges to enhance fuel economy; lowering combustion temperature to reduce generation and exhaust of NOx emissions; and preventing rapid combustion, knocking, and generation of combustion noise due to them.

According to an exemplary aspect of the present invention, there is provided an internal combustion engine that operates in a homogeneous-charge compression ignition mode in which a homogeneous charge of air-fuel mixture is compressed by a piston in a combustion chamber of a cylinder to start ignition. The internal combustion engine includes a fuel injector that directly sprays fuel into the combustion chamber, an intake valve member that opens or closes, when actuated, an intake port through which a gas intake passage communicates with the combustion chamber, and an exhaust valve member that opens or closes, when actuated, an exhaust port through which a gas exhaust passage communicates with the combustion chamber. The internal combustion engine includes a valve actuating mechanism for actuating the intake valve member and the exhaust valve member, and a cooling and recirculation system having a recirculation passage communicably connecting between the gas intake passage and the gas exhaust passage while bypassing the combustion chamber. During an intake stroke of the internal combustion engine, the valve actuating mechanism actuates the intake valve member to open the intake port, and actuates the exhaust valve member to open the exhaust port, thus returning a first part of exhaust gas discharged in the gas exhaust passage into the combustion chamber via the exhaust port, the first part of the exhaust gas having a high-temperature and remaining in the gas exhaust passage, so that a high-temperature mixture of first fresh air introduced into the combustion chamber via the intake port and the first part of the exhaust gas with the high temperature is generated in the combustion chamber. The cooling and recirculation system recirculates a second part of the exhaust gas discharged in the gas exhaust passage, which flows into the recirculation passage from the gas exhaust passage, into the gas intake passage via the recirculation passage while cooling the second part of the exhaust gas, so that a low-temperature mixture of second fresh air flowing in the gas intake passage and the second part of the exhaust gas with a low temperature is generated in the gas intake passage, and the low-temperature mixture of the second part of the second fresh air and the second part of the exhaust gas with the low temperature is introduced into the combustion chamber via the intake port, thus generating, in the combustion chamber, a stratified temperature distribution of the high-temperature mixture of the first fresh air and the first part of the exhaust gas with the high temperature and the low-temperature mixture of the second fresh air and the second part of the exhaust gas with the low temperature.

In a first embodiment of the exemplary aspect, the intake valve member is comprised of a pair of first and second intake valves disposed to open or close the intake port when actuated, the exhaust valve member is comprised of a pair of first and second exhaust valves disposed to open or close the exhaust port when actuated, the first intake valve and the first exhaust valve are arranged to be opposite to each other, the second intake valve and the second exhaust valve are arranged to be opposite to each other, the recirculation passage is communicably connected to the gas intake passage such that a connected position of the recirculation passage to the gas intake passage allows the second part of the exhaust gas to be introduced into the first intake valve, and the first part of the exhaust gas to be returned into the combustion chamber is designed to pass through the second exhaust valve.

In a second embodiment of the exemplary aspect, the cooling and recirculation system is configured to recirculate the second part of the exhaust gas via the recirculation passage while a parameter based on a request load for the internal combustion engine and a value of a speed of the internal combustion engine is located within a predetermined region in an operating range of the internal combustion engine.

In a third embodiment of the exemplary aspect, the fuel injector is configured to directly spray fuel during the intake stroke of the internal combustion engine that operates in the homogeneous-charge compression ignition mode.

In a fourth embodiment of the exemplary aspect, the intake valve member is comprised of a pair of first and second intake valves disposed to open or close the intake port when actuated, the exhaust valve member is comprised of a pair of first and second exhaust valves disposed to open or close the exhaust port when actuated, the first intake valve and the first exhaust valve are arranged to be opposite to each other, the second intake valve and the second exhaust valve are arranged to be opposite to each other, the recirculation passage is communicably connected to the gas intake passage such that a connected position of the recirculation passage to the gas intake passage allows the second part of the exhaust gas to be introduced into the first intake valve, and the first part of the exhaust gas to be returned into the combustion chamber is designed to pass through the second exhaust valve. The internal combustion engine further includes a partitioning wall that partitions the intake port and a part of the gas intake passage communicating therewith; the partitioning wall being located at least downstream of another position in the gas intake passage where the second part of the exhaust gas cooled by the cooling and recirculation system is introduced.

The internal combustion engine according to the exemplary aspect of the present invention results in: an expansion of its operating range in the homogeneous-charge compression ignition mode in its total operating range; drop in combustion temperature to reduce generation and exhaust of NOx emissions; and prevention of rapid combustion, knocking, and generation of combustion noise due to them.

BRIEF DESCRIPTION OF THE DRAWINGS

Other aspects of the present invention will become apparent from the following description of embodiments with reference to the accompanying drawings in which:

FIG. 7 is a view schematically illustrating a combustion chamber of a cylinder of the internal combustion engine in which how gas stratification is generated during the internal combustion engine operating in the homogenous-charge ignition mode;

DETAILED DESCRIPTION OF EMBODIMENT

Figure 1:
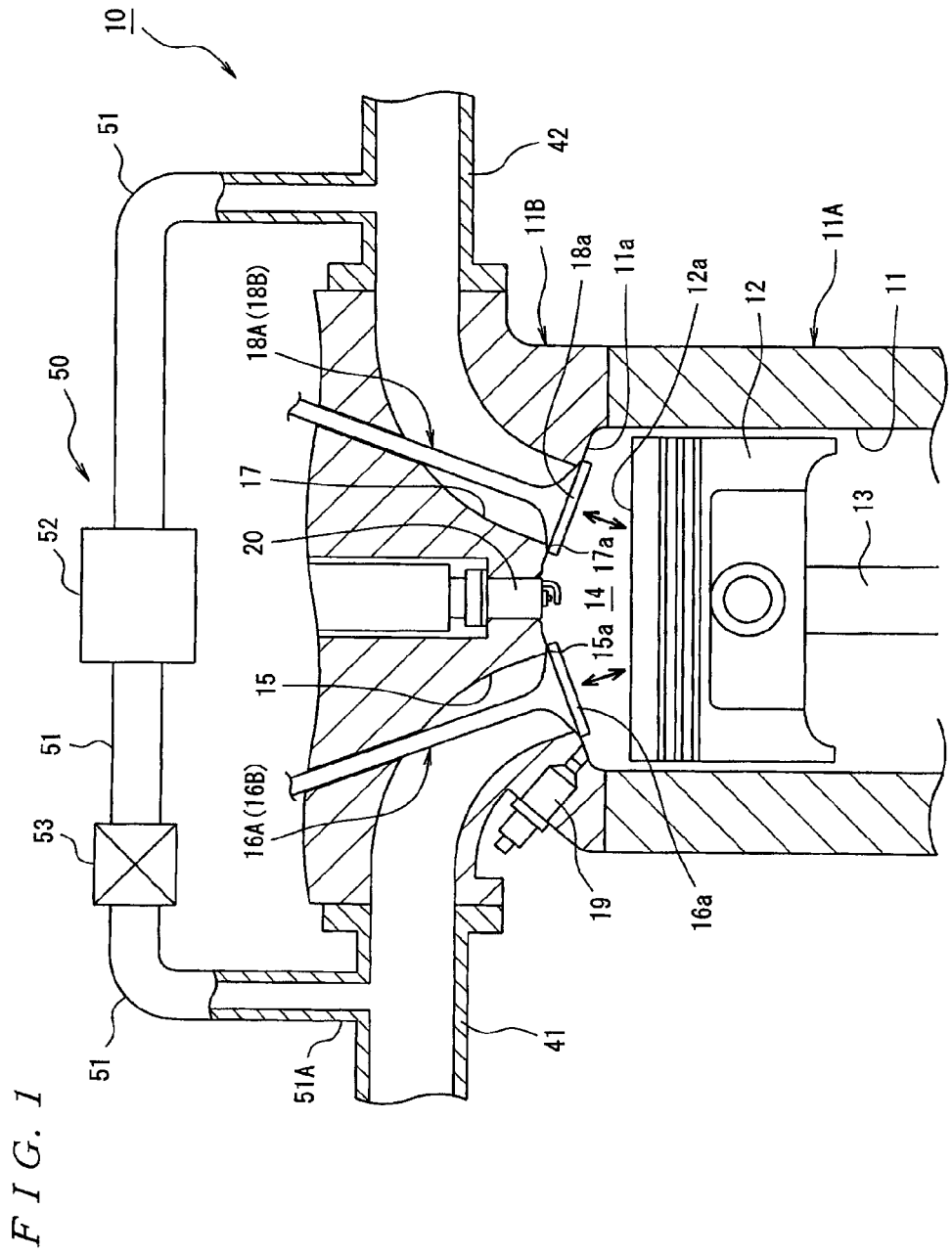
FIG. 1 is a view schematically illustrating the principle part of an internal combustion engine according to an embodiment of the present invention.

Internal combustion engines according to embodiments of the present invention will be described hereinafter with reference to the accompanying drawings. The drawings are schematic drawings, and therefore the dimensions of elements illustrated in the drawings need not be identical to those of corresponding actual ones. Similarly, the ratios between the dimensions of the illustrated elements need not be identical to those between the dimensions of corresponding actual ones, and the shapes of the illustrated elements need not be identical to those of corresponding actual ones. The dimensions of one or more elements illustrated in one drawing need not be identical to those of them illustrated in another drawing. Similarly, the ratios between the dimensions of one or more elements illustrated in one drawing need not be identical to those between the dimensions of them illustrated in another drawing, and the shapes of one or more elements illustrated in one drawing need not be identical to those of them illustrated in another drawing.

An internal combustion engine 10 according to an embodiment of the present invention is designed to operate switchably in a spark-ignition mode and a homogenous-charge ignition mode, referred to as HCCI mode hereinafter, in a predetermined total operating range in terms of speed and load. In the HCCI mode, a homogeneous charge of air-fuel mixture is compressed by a piston in a combustion chamber to start ignition.

Referring to FIG. 1, the internal combustion engine 10, referred to simply as the engine 10, according to this embodiment includes a cylinder block 11A and a cylinder head 11B mounted on the top of the cylinder block 11A. In the cylinder block 11A, a plurality of cylinders 11 are formed. In this embodiment, four cylinders 11 are formed in the cylinder block 11A arranged in a line (see FIG. 4). The cylinder head 11B has a bottom surface 11a formed for each cylinder 11. In each of the cylinders 11, a piston 12 is disposed to reciprocate, the space between the head 12a of the piston 12 and the bottom surface 11a of the corresponding cylinder 11 defining a combustion chamber 14. The combustion chamber 14 of each cylinder 11 communicates via an intake port 15 with an intake manifold, i.e. the assembly of intake tubes, 41 serving as a gas intake passage, and communicates via an exhaust port 17 with an exhaust manifold, i.e. the assembly of exhaust tubes, 42 serving as a gas exhaust passage. The intake port 15 and the exhaust port 17 are symmetric with respect to the longitudinal axis of a corresponding cylinder 11. A spark plug 20 is disposed in the cylinder head 11B for each cylinder 11 to direct communication with the combustion chamber 14. The spark plug 20 is controlled to generate a spark in the combustion chamber 14 to start combustion of air-fuel mixture therein while the internal combustion engine 10 operates in the spark-ignition mode.

The engine 10 includes, for each cylinder 11, a fuel injector, referred to simply as an injector, 19, a pair of intake valves 16A and 16B, a pair of exhaust valves 18A and 18B, and a pair of valve actuating mechanisms 40A and 40B. The engine 10 also includes an exhaust gas cooling and recirculation system, referred to simply as a cooling and recirculation system, 50.

The injector 19 is disposed in the cylinder head 11B to directly communicate with the combustion chamber 14 of a corresponding cylinder 11, and designed to receive high-pressurized fuel from, for example, a fuel supply (not shown) for direct injection of fuel into the combustion chamber 14. The intake valves 16A and 16B are disposed in the cylinder head 11B, and are controlled to open or close the intake port 15 of a corresponding cylinder 11 for allowing fresh air to be introduced into the combustion chamber 14 via the intake port 15. The exhaust valves 18A and 18B are so disposed in the cylinder head 11B as to be symmetric with respect to the longitudinal axis of a corresponding cylinder 11. The exhaust valves 18A and 18B are controlled to open or close the exhaust port 17 of the corresponding cylinder 11 for allowing exhaust gas due to combustion of the air-fuel mixture in the combustion chamber 14 to be outputted from the combustion chamber 14 via the exhaust port 17 into the exhaust manifold 42.

The valve actuating mechanism 40A is operative to actuate the intake valves 16A and 16B at respective individual timings to open or close the intake port 15, and the valve actuating mechanism 40B is operative to actuate the exhaust valves 18A and 18B at respective individual timings to open or close the exhaust port 17.

The cooling and recirculation system 50 is disposed outside of the combustion chambers 14 (cylinders 11) and configured to pipe the exhaust manifold 42 to the intake manifold 41 for recirculating exhaust gas passing in the exhaust manifold 42 into the intake manifold 41 while cooling it.

Particularly, during an intake stroke of the engine 10 operating in the HCCI mode, the intake valves 16A and 16B are controlled by the valve actuating mechanism 40A to open the intake port 15, and the exhaust valve 18B is controlled by the valve actuating mechanism 40B to open the exhaust port 17. This results in return of exhaust gas with a high temperature from the exhaust port 17 into the combustion chamber 14. In addition, during an intake stroke of the internal combustion engine 10, exhaust gas, which has been returned from the exhaust manifold 42 while being cooled by the cooling and recirculation system 50 so that it has a low temperature, is introduced together with flesh air into the combustion chamber 14 into the combustion chamber 14 via the intake valve 16A.

Thus, in the combustion chamber 14, a mixture of recirculated exhaust gas with a low temperature and flesh air, and a mixture of exhaust gas with a high temperature and fresh air are contained, so that stratification of the mixture of fresh air and exhaust gas with a high temperature and the mixture of the recirculated exhaust gas with a low temperature and flesh air is created in the combustion chamber 14. In other words, a stratified temperature distribution of exhaust gas is created in the combustion chamber 14.

For example, the cooling and recirculation system 50 according to this embodiment is provided to communicably connect the exhaust manifold 42 communicating with the exhaust port 17 to the intake manifold 41 communicating with the intake port 15.

Next, a specific structure of the engine 10 according to this embodiment will be described hereinafter.

Referring to FIG. 1, the piston 12 reciprocating in a corresponding cylinder 11 is coupled to a crankshaft (not shown) via a connecting rod 13. This allows the reciprocating motion of the piston 12 into the rotary motion of the crankshaft. The rotary motion of the crankshaft serves as output rotary power of the engine 10.

The engine 10 includes sensors and a controller (not shown). The sensors are operative to generate signals indicative of operating conditions or parameters of the engine 10. The sensors are in electrical communication with the controller. The controller is in electrical communication with the spark plug 20, the valve actuating mechanisms 40A and 40B, and the cooling and recirculation system 50.

The operating conditions or parameters of the engine 10 include, for example, a parameter indicative of the speed of the engine 10, a parameter indicative of rotational angle of the crankshaft, request load for the engine 10, engine coolant temperature, intake air quantity/temperature, and exhaust gas temperature. For example, a crank angle sensor in the sensors is operative to output, to the controller, a crank pulse each time the crankshaft is rotated by a preset angle. Counting the number of crank pulses sent from the crank angle sensor allows the speed of the engine 10 to be measured.

If the engine 10 is installed in a vehicle, request load can be represented as, for example, a driver's operated (depressed) stroke of a driver-operable accelerator pedal of the vehicle, and the driver's operated stroke of the driver-operable accelerator pedal can be measured by an accelerator sensor included in the engines.

Specifically, the engine 10 is configured such that, under control of the controller, the injector 19, the valve actuating mechanisms 40A and 40B, and/or the spark plug 20 pull combustion air into the combustion chamber 14 of a corresponding cylinder 11 during an intake stroke (down travel of the piston 12); compress mixture of directly supplied fuel and intake air in the combustion chamber 14 during a compression stroke (up travel of the piston 12); cause burning of the compressed air-fuel mixture by HCCI ignition or spark ignition, resulting in down travel of the piston 12 as a power stroke; and expel exhaust gas from the combustion chamber 14 during an exhaust stroke (up travel of the piston 12). The engine 10 operates in the HCCI mode or spark ignition mode to repeat the four strokes for each cylinder.

Next, the structures of the intake valves 16A and 16B and those of the exhaust valves 18A and 18B will be described hereinafter.

Referring to FIG. 1, the intake port 15 has at its one end a pair of openings 15a in the bottom surface 11a of the cylinder head 11B; the openings 15a are aligned in parallel to the arrangement direction of the cylinders 11. Similarly, the exhaust port 17 has at its one end a pair of openings 17a in the bottom surface 11a of the cylinder head 11B; the openings 17a are symmetric and parallel to the openings 15a about a virtual plane passing the longitudinal axis of a corresponding cylinder 11 and extending in the arrangement direction of the cylinders 11.

Each of the intake valves 16A and 16B is comprised of a valve shaft 21 and a discoid head 16a larger in diameter than the valve shaft 21. Each of the intake valves 16A and 16B is movably installed in the intake port 15 for opening and closing, with the head 16a, a corresponding one of the openings 15a. Similarly, each of the exhaust valves 18A and 18B is comprised of a valve shaft 21 and a discoid head 18a formed to one end of the valve shaft 21 to be larger in diameter than the valve shaft 21. Each of the intake valves 18A and 18B is movably installed in the exhaust port 17 for opening and closing, with the head 18a, a corresponding one of the openings 17a.

That is, when each of the intake valves 16A and 16B is seated at its head 16a on the bottom surface 11a of the cylinder head 11B, a corresponding one of the openings 15a is closed, so that the intake port 15 is closed. When each of the intake valves 16A and 16B being seated on the bottom surface 11a is lifted, a corresponding one of the openings 15a is opened, which allows combustion air to be introduced into the combustion chamber 14.

Similarly, when each of the exhaust valves 18A and 18B is seated at its head 18a on the bottom surface 11a of the cylinder head 11B, a corresponding one of the openings 17a is closed, so that the exhaust port 17 is closed. When each of the exhaust valves 18A and 18B being seated on the bottom surface 11a is lifted, a corresponding one of the openings 17a is opened, which allows exhaust gas in the combustion chamber 14 to be expelled therefrom.

Figure 4:
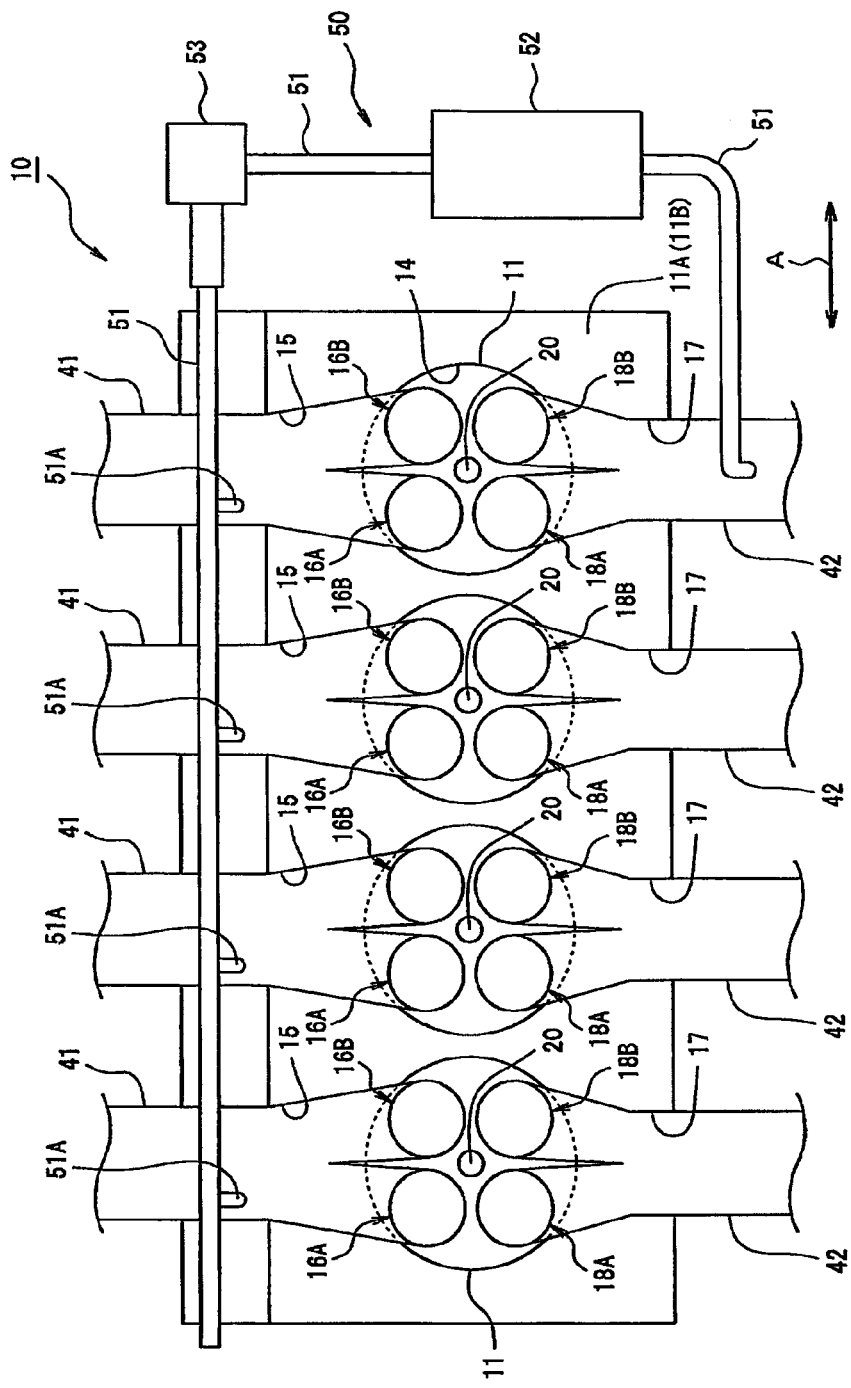
FIG. 4 is a view schematically illustrating: the pair of intake valves for each cylinder; a pair of exhaust valves for each cylinder; and an exhaust gas cooling and recirculation system of the internal combustion engine as viewed from the corresponding piston sides.

Referring to FIG. 4, the intake valves 16A and 16B are aligned in parallel to the arrangement direction (arrow A in FIG. 4) of the cylinders 11, and the exhaust valves 18A and 18B are aligned in the arrangement direction A of the cylinders 11 to be opposite to the respective intake valves 16A and 16B. In other words, a first pair of the intake valve 16A and the exhaust valve 18A and a second pair of the intake valve 16B and the exhaust valve 18B are arranged to be opposite to each other.

Next, the structures and operations of the valve actuating mechanisms 40A and 40B will be described hereinafter with reference to FIGS. 2 and 3.

Figure 2:
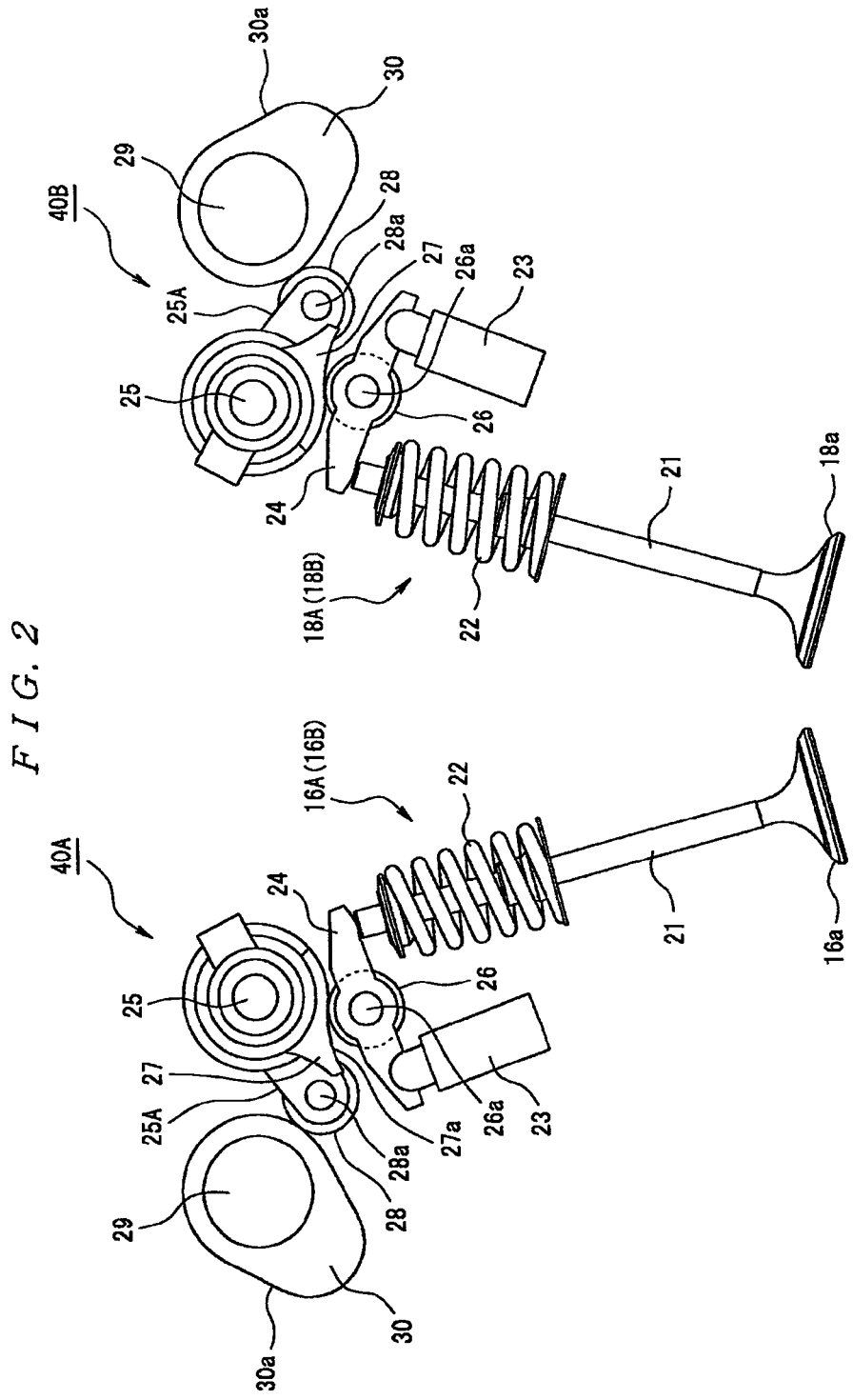
FIG. 2 is a side view of an intake valve, an exhaust valve, and a pair of valve actuating mechanisms of the internal combustion engine.

Referring to FIG. 2, the valve shaft 21 of each of the intake valves 16A and 16B and the exhaust valves 18A and 18B is urged by a spring to close a corresponding opening, i.e., to cancel lift of a corresponding valve. These intake valves 16A and 16B and the exhaust valves 18A and 18B are actuated at individual timings by the valve actuating mechanisms 40A and 40B to open or close a corresponding intake port 15 or exhaust port 17. Each of the valve actuating mechanisms 40A and 40B is made up of a pivot 23, a rocker arm 24, a control shaft 25, a swing member 25A, a roller 26, a pair of control members, i.e. swing cams 27, a swing roller, i.e. a cam follower 28, a cam shaft 29, and a drive cam 30.

The pivot 23 swingably supports the rocker arm 24 with its one axial end being abutment on one end of the rocker arm 24. On the other end of the rocker arm 24, the other end (upper end in FIG. 2) of the valve shaft 21 is in abutment by biasing force of the spring 22. The rocker arm 24 is formed at its middle with the roller 26 that is pivotally supported by a supporting pin 26a. The rocker arm 24 is adapted to swing to follow the swing of the control members 27 about the center axis of the control shaft 25 with the roller 26 being in abutment on the control members 27.

Each of the control members 27 is threadably fixed on a predetermined position of the outer circumference of the control shaft 25 corresponding to the timing of lift of a corresponding valve described later. The swing member 25A has opposing first and second ends in its length direction. The first end of the swing member 25A is mounted on the control shaft 25. The swing roller 28 is pivotally supported by a supporting pin 28a on the second end of the swing member 25A. Each of the control members 27 is adapted to limit the lift of a corresponding valve head 16a or 18a at the one end of the valve shaft 21 according to a pressure contact position between a corresponding one of the control members 27 and the roller 26 at the middle of the rocker arm 24.

Referring to FIG. 2, the swing roller 28 is biased by a biasing member (not shown) in clockwise direction about the control shaft 25. The cam shaft 29 is coupled to the crankshaft (not shown) so as to be turned in synchronization with rotation of the crankshaft. The drive cam 30, which has a lobe and as its outer circumference a cam surface 30a, is fixed to the outer circumference of a predetermined position of the cam shaft 29. The outer circumference of the swing roller 28 biased in clockwise direction about the control shaft 25 is brought in abutment on the cam surface 30a.

With the configuration of each of the valve actuating mechanisms 40A and 40B, the lobe of the drive cam 30 pushes the swing roller 28, which is in pressure abutment on the cam surface 30a, to swing the swing roller 28 during rotation of the camshaft 29, so that the rocker arm 24 swings via the roller 26, which is in pressure abutment on the control member 27 integrated with the swing member 25A on which the swing roller 28 is supported. This causes a corresponding one of the valves 16A, 16B, 18A, and 18B to move downward, i.e. axially shift downward, against the biasing force of the spring 22, which allows a corresponding one of the valve heads 16a and 18a to lift off a corresponding one of the openings 15a and 17a. The lift of the valve head 16a allows air to be introduced into the combustion chamber 14 via the intake port 15, and the lift of the valve head 18a allows exhaust gas to be expelled from the combustion chamber 14 via the exhaust port 17.

In contrast, when the lobe of the drive cam 30 is separated from the swing roller 28, which is in pressure abutment on the cam surface 30a, to swing the swing roller 28 during rotation of the camshaft 29, the biasing force of the spring 22 causes a corresponding one of the valve heads 16a and 18a to move upward, i.e. axially shift upward. This results in close contact of a corresponding one of the valve heads 16a and 18a on a corresponding one of the openings 15a and 17a, thus closing a corresponding one of the intake port 15 and the exhaust port 17.

Figure 3:
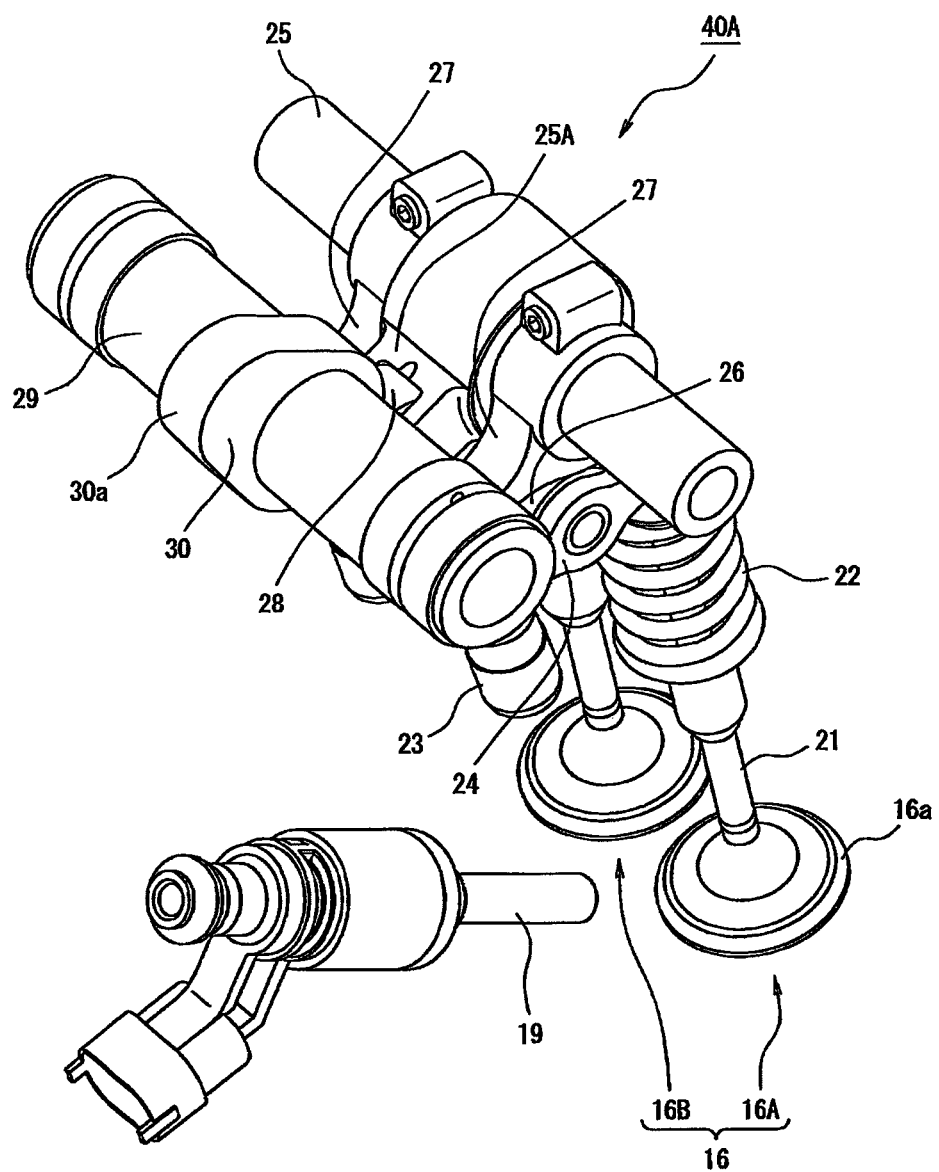
FIG. 3 is a perspective view schematically illustrating the arrangement of a fuel injector, a pair of intake valves, and the pair of valve actuating mechanisms of the internal combustion engine.

Referring to FIG. 3, the control members 27 are adjacently located on both sides of the swing member 25A in the axial direction of the control shaft 25. Each of the control members 27 has a control surface 27a (see FIG. 2) on which the roller 26 of the rocker arm 24 is in pressure abutment.

Each of the control surfaces 27a of the control members 27 has a common profile shaped such that the pressure contact position between the roller 26 of the rocker arm 24 and a corresponding control member (swing cam) 27 approaches and recedes to/from the center axis of the control shaft 25 as the control members 27 swing about the center axis of the control shaft 25. Thus, the variation of the pressure contact position (relative rotational position) between the roller 26 of the rocker arm 24 and each control member 27 allows the amount of swing of the rocker arm 24 to be adjusted.

In this embodiment, each of the valve actuating mechanisms 40A and 40B is comprised of a motor (not shown) to which the control shaft 25 is coupled, and the motor is communicably connected to the controller. Under control of the controller, continuous adjustment of the rotational angle of the control shaft 25 changes the pressure contact position between the roller 26 of the rocker arm 24 and each control member 27, thus changing the lift of a corresponding valve.

Figure 5:
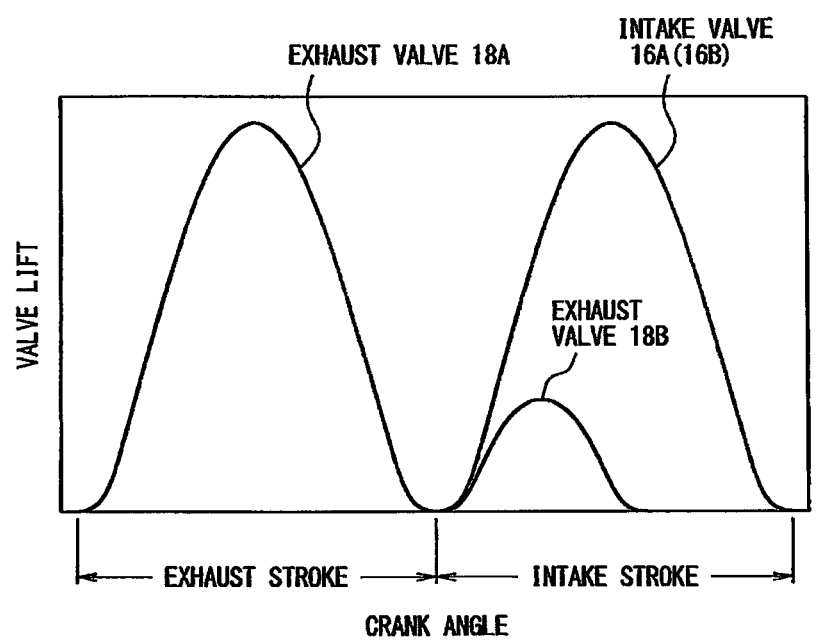
FIG. 5 is a graph schematically illustrating an example of lift of each of the pair of intake valves and the pair of exhaust valves in terms of crank angle during the internal combustion engine operating in a homogenous-charge ignition mode.

In addition, referring to FIG. 5, under control of the controller according to this embodiment during the exhaust stroke, the valve actuating mechanism 40B activates the exhaust valve 18A to open the exhaust port 17 while the other valves are closing the corresponding ports such that the lift, i.e. working stroke, of the exhaust valve 18A is changed like a sinusoidal wave with a predetermined large value as its amplitude.

Referring to FIG. 5, under control of the controller during the intake stroke, both the valve actuating mechanisms 40A and 40B activate the intake valves 16A and 16B and the exhaust valve 18B to open the intake port 15 and the exhaust port 17. This changes the lift of each of the intake valves 16A and 16B like a sinusoidal wave with a predetermined large value as its amplitude while changing the lift of the exhaust valve 18B like a sinusoidal wave with a predetermined small value as its amplitude.

Specifically, under control of the controller, each of the valve actuating mechanisms 40A and 40B is driven such that the phase of the pressure contact position between the roller 26 of the rocker arm 24 and each control member 27 is in agreement with that of the lift of a corresponding one of the intake and exhaust values 16A, 16B, 18A, and 18B illustrated in FIG. 5. In other words, each of the valve actuating mechanisms 40A and 40B matches how the pressure contact position between the roller 26 of the rocker arm 24 and each control member 27 is changed with how the lift of a corresponding one of the intake and exhaust values 16A, 16B, 18A, and 18B is changed.

In this embodiment, the valve opening timing, valve lift stroke, and valve opening period of the exhaust valve 18A for each cylinder 11 are controlled to be in agreement with each other, and the valve opening timing, valve lift stroke, and valve opening period of the exhaust valve 18B for each cylinder 11 are controlled to be in agreement with each other.

The injector 19 is located between the pair of intake valves 16A and 16B (see FIG. 3). Referring to FIG. 1, under control of the controller, the injector 19 is configured to directly spray, based on high-pressurized fuel from the fuel supply, a predetermined quantity of fuel into the combustion chamber 14 at a predetermined timing, for example, during the intake stroke or the compression stroke, when each of the intake valves 16A and 16B reciprocates to open the opening 15a of the intake port 15 and close it in synchronization with movement of the piston 12, i.e. rotation of the crankshaft. Particularly, the injector 19 according to this embodiment is designed such that the direction of fuel injection thereby is set toward a point in the combustion chamber 14; the point is the center of the top 12a of the piston 12 when the top 12a of the piston 12 will be located at TDC (Top Dead Center).

Next, the structure and the operations of the cooling and recirculation system 50 will be described hereinafter.

Referring to FIGS. 1 and 4, the cooling and recirculation system 50 is comprised of a recirculation pipe 51, an EGR cooler 52, and an EGR valve device 53. The recirculation pipe 51 is a recirculation passage that communicably connects between each intake tube of the intake manifold 41 and, for example, one exhaust tube of the exhaust manifold 42 corresponding to one cylinder 11 while bypassing the combustion chamber 14. The EGR cooler 52 is communicably located on the recirculation pipe 51 upstream of the EGR valve device 53 and adapted to cool exhaust gas introduced from the exhaust manifold 42, thus transferring the cooled exhaust gas to the intake manifold 41. The EGR valve 53 is communicably connected to the controller. Under control of the controller, the EGR valve device 53 is adapted to start transfer of exhaust gas from the exhaust manifold 42 to the intake manifold 41, stop the transfer of exhaust gas, and regulate the amount of exhaust gas being transferred to intake manifold 41. The EGR cooler 52 can be comprised of a water-cooling system and/or an air-cooling system, or can be comprised of a pipe with a long length required to sufficiently cool exhaust gas.

Particularly, in this embodiment, the recirculation pipe 51 includes joints 51A, and is communicably connected, via the joints 51A, to the intake tubes of the intake manifold 41 for the respective cylinders 11 (see FIG. 4). Note that each of the joints 51A is located upstream of a path of flow of fresh air, i.e. combustion air, into the intake valve 16A for a corresponding one of the cylinders 11, which allows exhaust gas cooled by the EGR cooler 52 to be introduced into the intake valve 16A for a corresponding one of the cylinders 11. Specifically, each of the joints 51A is located closer to the intake valve 16A for a corresponding one of the cylinders 11 than the intake valve 16B therefore such that cooled exhaust gas is directed toward the intake valve 16A without being directed toward the intake valve 16B.

In this embodiment, in order to make operate the engine 10 in the HCCI mode, the controller is programmed to control the exhaust valve 18B for each of the cylinders 11 to open the exhaust valve 18B at the timing and duration illustrated in FIG. 5 during the intake stroke, thus making exhaust gas with high temperature in the exhaust manifold 42 be fed back through the cooling and recirculation system 50 into the combustion chamber 14 via the intake manifold 41.

Next, operations of the engine 10 according to this embodiment will be described hereinafter.

Figure 6:
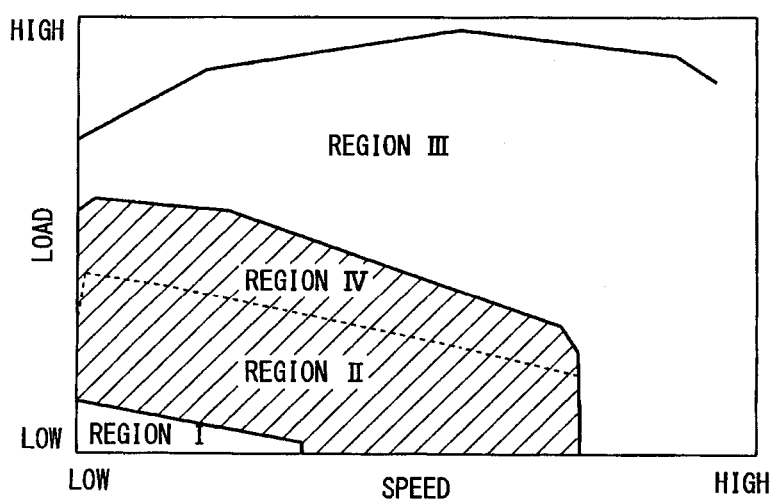
FIG. 6 is a graph schematically illustrating an example of the operating range of the internal combustion engine in terms of engine speed and load.

FIG. 6 schematically illustrates a map, such as a data table and a program, representing an example of the operating range of the engine 10 in terms of engine speed and load. In this embodiment, a parameter indicative of the operation-mode of the engine 10 as a function of request load and engine speed. The map is, for example, stored in the controller. That is, the controller determines which of the operation modes, i.e. the HCCI mode and the spark-ignition mode, is applied to the engine 10 using inputs of request load and engine speed.

Specifically, in FIG. 6, a first region I of the operating range, in which both request load and engine speed are relatively low, shows the spark-ignition mode as the operation mode of the engine 10, and a third region III, in which at least one of request load and engine speed is relatively high, shows the spark-ignition mode as the operation mode of the engine 10.

In contrast, each of second and fourth regions II and IV, in which either request load is middle load or engine speed is middle speed, shows the HCCI mode as the operation mode of the engine 10. Either the second or fourth region II or IV is used during normal operation of the engine 10.

Specifically, if a value of the parameter based on an input value of request load and an input value of engine speed is located within the first region I, the controller determines the spark-ignition mode as the operation mode of the engine 10. Thus, under control of the controller, the injector 19, the intake valves 16A and 16B via the valve actuating mechanism 40A, the exhaust valve 18A and 18B via the valve actuating mechanism 40B, and the igniter 21 for each cylinder 11 work to generate combustion of air-fuel mixture in the combustion chamber 14 of each cylinder 11 based on a spark generated by the spark plug 20.

Similarly, in FIG. 6, if a value of the parameter based on an input value of request load and an input value of engine speed is located within the third region III in FIG. 6, the controller deter the spark-ignition mode as the operation mode of the engine 10. Thus, under control of the controller, the injector 19, the intake valves 16A and 16B via the valve actuating mechanism 40A, the exhaust valve 18A and 18B via the valve actuating mechanism 40B, and the igniter 21 for each cylinder 11 work to generate combustion of air-fuel mixture in the combustion chamber 14 of each cylinder 11 based on a spark generated by the spark plug 20.

In contrast, a value of the parameter based on an input value of request load and an input value of engine speed is located within the second region II or the fourth region IV in FIG. 6, the controller determines the HCCI mode as the operation mode of the engine 10. Thus, under control of the controller, the injector 19, the intake valves 16A and 16B via the valve actuating mechanism 40A, the exhaust valve 18A and 18B via the valve actuating mechanism 40B, and the EGR valve device 53 for each cylinder 11 work to generate auto combustion, i.e. self-combustion, of compressed air-fuel mixture in the combustion chamber 14 of each cylinder 11. The HCCI combustion eliminates the need to generate a spark to thereby reduce energy consumption, lower combustion temperature to reduce generation and discharge of NOx emissions, and prevent rapid combustion, knocking, and generation of combustion noise due to them.

Under control of the controller, the engine 10 according to this embodiment operates in the HCCI mode to optimize the flow of exhaust gas for HCCI combustion. More specifically, the region II in FIG. 6 represents a region in which the engine 10 could operate in the HCCI mode even if the cooling and recirculation system 50 were not provided in the engine 10. That is, the sum of the region II and the region IV represents a region in which the engine 10 can operate in the HCCI mode using stratification of exhaust gas generated based on internal EGR and exhaust gas generated based on external EGR according to this embodiment.

Specifically, referring to FIG. 5, the controller controls the valve actuating mechanisms 40A and 40B and the EGR valve device 53 during the intake stroke of a corresponding cylinder 11 such that: the valve actuating mechanisms 40A and 40B activate the intake valves 16A and 16B to open the intake port 15 with a large lift stroke thereof; the valve actuating mechanism 40B activates the exhaust valve 18B to open the exhaust port 17 with a small lift stroke thereof; and the EGR valve device 53 drives to open the recirculation pipe 51.

The open of the exhaust port 17 introduces exhaust gas discharged from the combustion chamber 14 via the exhaust port 17 using internal EGR into the combustion chamber 14 again. Parallelly, the opening of the recirculation pipe 51 by the EGR valve device 53 causes exhaust gas cooled by the cooling and recirculation system 50 to be introduced via the intake valve 16A into the intake manifold 41 upstream of the intake valve 16A. In addition, during the intake stroke, the injector 19 directly sprays predetermined quantity of fuel into the combustion chamber 14 at a predetermined timing. The spraying fuel into the combustion chamber 14 during the intake stroke allows the sprayed fuel to be homogeneously distributed therein.

Referring to FIG. 7, the operations of the engine 10 during the intake stroke set forth above generate first stratified gas, i.e. a first lean mixture layer, with a high temperature in a region in the combustion chamber 14, which faces the second pair of intake valve 16B and the exhaust valve 18B (see right half of the combustion chamber 14 in FIG. 7); the first stratified gas is composed of exhaust gas with a high temperature introduced via the exhaust valve 18B based on internal EGR and fresh air "a" introduced via the intake valve 16B facing the exhaust valve 18B. Simultaneously, the operations of the engine 10 during the intake stroke set forth above generate second stratified gas, i.e. a second lean mixture, with a low temperature in a region in the combustion chamber 14, which faces the first pair of intake valve 16A and the exhaust valve 18A (see left half of the combustion chamber 14 in FIG. 7); the second stratified gas is composed of a mixture of fresh air "a" introduced via the intake valve 16A and exhaust gas cooled by the cooling and recirculation system 50 based on external EGR.

That is, the engine 10 according to this embodiment is designed to generate stratification of the first lean gas layer with a high temperature and the second lean gas layer with a low temperature in the combustion chamber 14 to thereby increase temperature stratification in the combustion chamber 14, resulting in slowdown in fuel-mixture combustion. Thus, it is possible to expand the upper load limit of the operating load range of the engine 10 in the HCCI mode, thus enabling the engine 10 to operate in the HCCI mode in the region IV in addition to the region II.

Particularly, the engine 10 according to this embodiment is designed such that the cooling recirculation system 50 recirculates exhaust gas discharged from the combustion chamber 14 through the recirculation pipe 51 located external to the cylinder head 11B while cooling it. This achieves temperature stratification with larger temperature difference rather than that achieved by known engines using HCCI combustion. Specifically, the engine 10 according to this embodiment achieves sufficient slowdown in fuel-mixture combustion in comparison to known engines using HCCI combustion. In addition, the engine 10 makes it possible to achieve complete combustion of exhaust gas in the combustion chamber, thus improving its clean-up performance of exhaust emissions.

With the engine 10 according to this embodiment, cooled exhaust gas and fresh air with a low temperature are homogeneously mixed during a relatively long period, resulting in moderate lean-oxygen mixture of cooled exhaust gas and fresh air. Large temperature-gradient stratification of the cooled gas mixture set forth above and exhaust gas with a high temperature fed back from the exhaust valve 18B based on internal EGR in the combustion chamber 14 results in a relatively small bulk of the cooled gas mixture. This effects HCCI combustion in the combustion chamber 14 while sufficiently slowing down the combustion speed.

Particularly, the engine 10 according to this embodiment is configured such that a mixture of exhaust gas with a high temperature and cooled exhaust gas in the combustion chamber 14 increases the percentage of the exhaust gas therein, resulting in suppression of the increase in local combustion speed, thus reducing vibrations and noise to be created by the engine 10. In addition, the engine 10 is configured such that exhaust gas with a high temperature is introduced into the combustion chamber 14. This configuration contributes to an increase in the temperature inside the combustion chamber 14 (the corresponding cylinder 11), thus reducing peak combustion temperature and peak combustion pressure during HCCI combustion. In this embodiment, the intake port 15 into which little cooled exhaust gas is introduced is located to face the exhaust valve 18B for returning exhaust gas with a high temperature. This configuration slightly reduces an amount of fresh air to be introduced into the combustion chamber 14, but restricts the increase in negative pressure inside the corresponding intake port 15.

Figure 8:
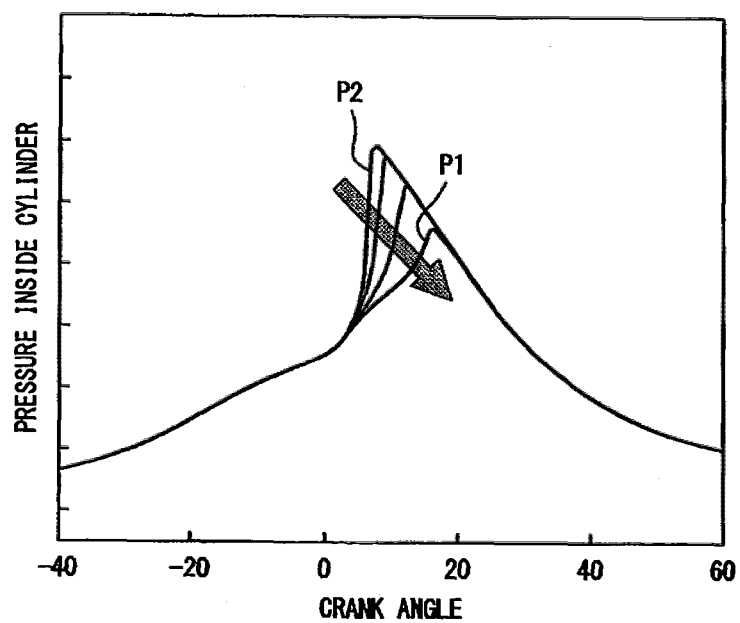
FIG. 8 is a graph schematically illustrating internal pressure of cylinder in terms of crank angle in the internal combustion engine.

FIG. 8 schematically illustrates technical effects of the engine 10 according to this embodiment in comparison to those of a known engine without including the configurations of the engine 10 set forth above. In the combustion chamber of the known engine operating in HCCI mode, auto-ignition occurs in the air-fuel mixture in the combustion chamber simultaneously at plural local points therein. This completes combustion of air-fuel mixture in a short period of time. For this reason, in the known engine, overlaps of air-fuel mixture ignitions in the combustion chamber 14 result in an instantaneous rise of the pressure P2 inside the corresponding firing cylinder up to a predetermined upper limit.

In contrast, in the combustion chamber 14 of the engine 10 operating in the HCCI mode, large temperature stratification of the first lean mixture layer with a high temperature and the second lean mixture layer with a low temperature is generated in the combustion chamber 14 with fuel concentration being distributed from the center portion of the combustion chamber 14 close to the spark plug 20 toward its periphery. This results in slow combustion in which combustion automatically begins at the center portion of the combustion chamber 14 and thereafter spreads gradually toward its periphery. This makes auto-ignition occur in the air-fuel mixture in the combustion chamber 14 at plural local points therein at different times, thus reducing the rate of change on the pressure P1 inside the corresponding firing cylinder in comparison to the pressure P2 (see FIG. 8).

Thus, the engine 10 according to this embodiment retains the technical effects of HCCI combustion, such as low combustion temperature, and reduction in generation and exhaust of NOx emissions. In addition, the engine 10 prevents rapid combustion, knocking, and combustion noise due to them.

The engine 10 according to this embodiment is designed to generate a layered configuration of air-fuel mixture in the combustion chamber 14 to thereby effect on an inhomogeneous temperature distribution of the air-fuel mixture in the combustion chamber 14, making it possible to suppress combustion speed. Particularly, the engine 10 is configured such that exhaust gas with a low temperature cooled by the cooling and recirculation system 50 based on external EGR is mixed to fresh air introduced into the combustion chamber 14. This configuration reduces the percentage of high-purity fresh air in the combustion chamber 14, thus restricting an increase in local combustion speed in the combustion chamber 14. Thus, the engine 10 prevents rapid combustion, knocking, and combustion noise due to them in view of restriction of combustion speed.

Because of restriction of an increase in local combustion speed in the combustion chamber 14, it is possible to expand the upper load limit of the operating load range of the engine 10 in the HCCI mode from a middle load to a higher load. Specifically, as illustrated in FIG. 6, the engine 10 can operate in the HCCI mode in the higher load region IV in addition to the region II in which conventional engines can operate in the HCCI mode.

The engine 10 according to this embodiment is configured to change only the phase of the pressure contact position between the roller 26 of the rocker arm 24 and each of the control members 27, which has a control surface 27a with a common profile, of the valve actuating mechanisms 40A and 40B to thereby change the lift of a corresponding one of the intake and exhaust values 16A, 16B, 18A, and 18B. In other words, it is possible to control the lift of each of the intake and exhaust values 16A, 16B, 18A, and 18B, and timings of lift thereof, thus simplifying control parameters associated with lift of each of the intake and exhaust values 16A, 16B, 18A, and 18B.

Figure 9:
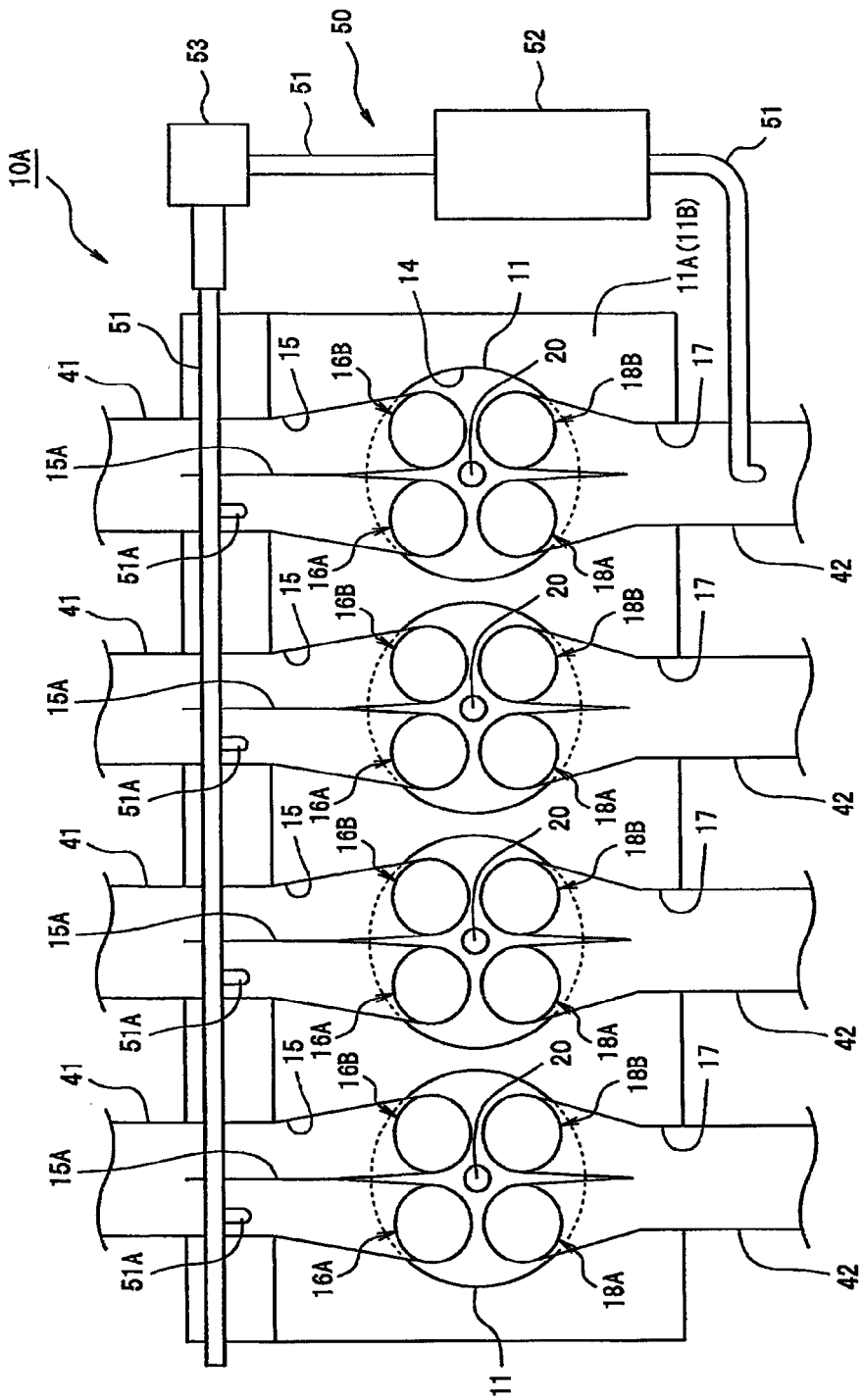
FIG. 9 is a view schematically illustrating: a pair of intake valves for each cylinder; a pair of exhaust valves for each cylinder; and an exhaust gas cooling and recirculation system of an internal combustion engine according to a modification of the embodiment as viewed from the corresponding piston sides.

FIG. 9 is a view schematically illustrating an internal combustion engine, referred to simply as an engine, 10A according to a modified embodiment of the present invention based on the engine 10 as viewed from the piston sides of the corresponding cylinders of the engine 10A. Referring to FIG. 9, the engine 10A is further comprised of partition walls 15A provided for the intake tubes of the intake manifold 41 for the respective cylinders 11. The partition wall 15A is disposed in the intake port 15 for each cylinder 11 to partition the intake port 15 and a part of the intake tube of the intake manifold 41 communicating therewith into a first channel communicating with the intake valve 16A and a second channel communicating with the intake valve 16B. The partition wall 15A extends from a part of the cylinder head 11B located between the intake valves 16A and 16B up to a position in the intake tube of the intake manifold 41 close to the corresponding joint 51A, the position is located at least downstream of the corresponding joint 51A, that is, the position can be located upstream of the corresponding joint 51A.

The configuration of the engine 10A allows exhaust gas cooled by the cooling and recirculation system 50 to be introduced mainly into fresh air flowing through the first channel into the intake valve 16A. That is, the configuration of the engine 10A introduces the mixture of cooled exhaust gas and fresh air with a low temperature into the combustion chamber while preventing cooled exhaust gas from being introduced into the intake valve 16B. This results in larger temperature stratification of the mixture of cooled exhaust gas and fresh air and the mixture of fresh air and exhaust gas with a high temperature fed back from the exhaust valve 18B, thus sufficiently slow down combustion speed.

The engine 10 according to this embodiment of the present invention has been described, but the descriptions and figures of which are not limited to the present invention. Skilled persons in the art could derive, from the descriptions and figures of the engine 10 according to this embodiment, various alternative embodiments, other embodiments, and operational techniques.

For example, in the engine 10 according to this embodiment, the valve actuating mechanism 40B actuates the exhaust valve 18A to open the exhaust port 17 such that the lift of the exhaust valve 18A is changed like a sinusoidal wave with a predetermined large value as its amplitude while the valve actuating mechanism 40B maintains the exhaust valve 18B closed in exhaust stroke, and the actuating mechanism 40B actuates the exhaust valve 18B to open the exhaust port 17 such that the lift of the exhaust valve 18B is changed like a sinusoidal wave with a predetermined small value as its amplitude. However, the present invention is not limited to the configuration.

Figure 10:
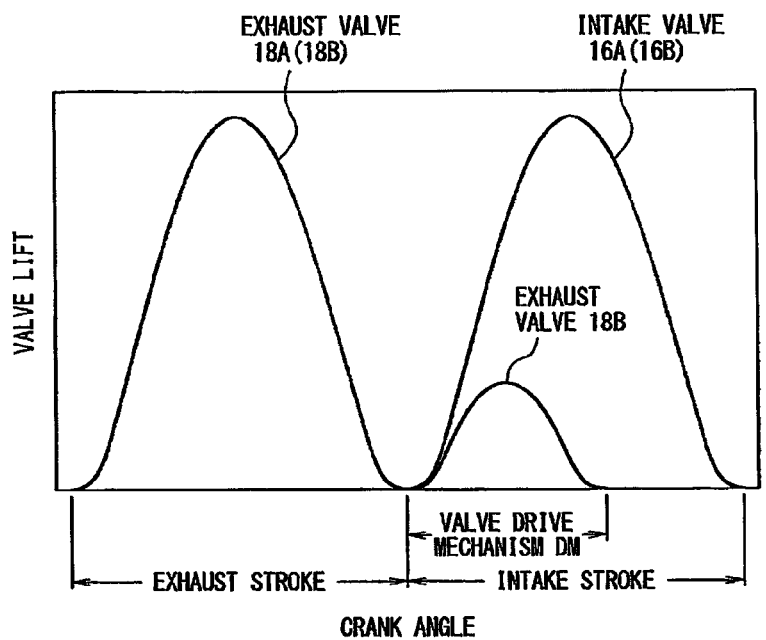
FIG. 10 is a graph schematically illustrating an example of lift of each of a pair of intake valves and a pair of exhaust valves in terms of crank angle during an internal combustion engine according to a modified embodiment of the present invention.

FIG. 10 schematically illustrates how to actuate the exhaust valves 18A and 18B and the intake valves 16A and 16B according to a modified embodiment of the present invention.

Specifically, in this modified embodiment, the valve actuating mechanisms 40B actuates, under control of the controller, the exhaust valves 18A and 18B to open the exhaust port 17 such that each of the lift of the exhaust valve 18A and that of the exhaust valve 18B is changed like a sinusoidal wave with a predetermined large value as its amplitude in exhaust stroke. In this modified embodiment, during intake stroke, the valve actuating mechanisms 40A actuate, under control of the controller, the intake valves 16A and 16B to open the intake port 15 such that each of the lift of the intake valve 16A and that of the intake valve 16B is changed like a sinusoidal wave with a predetermined large value as its amplitude. In addition, in this modified embodiment, the valve actuating mechanism 40B is equipped with valve drive means DM, such as decompression means, i.e. a decompression mechanism, and/or force means communicable with the controller 110 (see FIG. 10). The valve drive means DM drives, for example, the exhaust valve 18B under control of the controller such that the lift of the exhaust valve 18B is changed like a sinusoidal wave with a predetermined small value as its amplitude. For example, the valve drive means DM is configured to hydraulically press the other end of the rocker arm 24 downward, thus opening the exhaust port 17.

Figure 11:
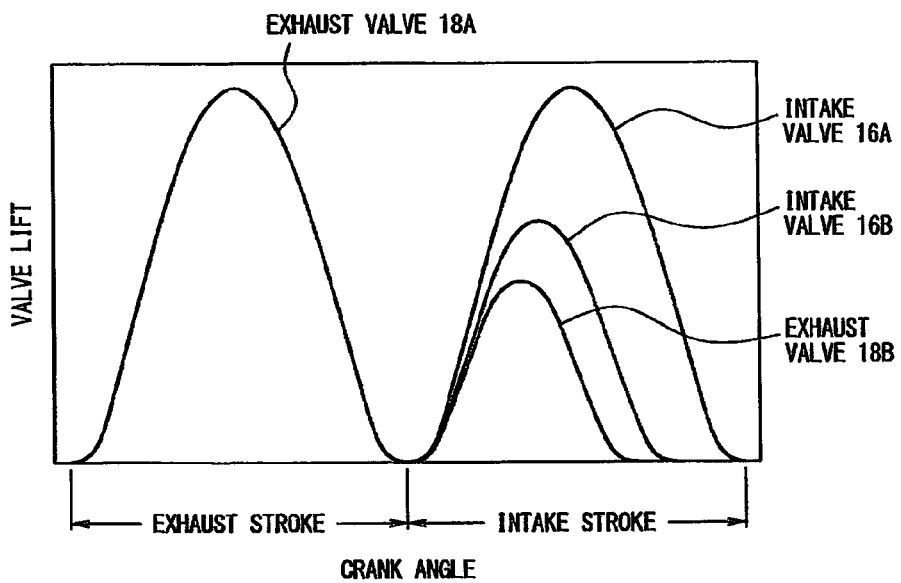
FIG. 11 is a graph schematically illustrating an example of lift of each of a pair of intake valves and a pair of exhaust valves in terms of crank angle during an internal combustion engine according to another modified embodiment of the present invention.

FIG. 11 schematically illustrates how to actuate the intake valves 16A and 16B according to another modified embodiment of the present invention. In this modified embodiment, the valve actuating mechanism 40A activates the intake valves 16A and 16B to open the intake port 15 such that the lift of the intake valve 16A is changed like a sinusoidal wave with a predetermined first large value as its amplitude, and the lift of the intake valve 16B is changed like a sinusoidal wave with a predetermined second large value as its amplitude slightly smaller than the first large value. This increases the percentage of the amount of exhaust gas returned into the combustion chamber 14 via the exhaust valve 18B from the exhaust port 17 based on internal EGR in comparison to the amount of fresh air introduced into the combustion chamber 14 via the intake valve 16B.

In the engine 10, the valve actuating mechanisms 40A and 40B change the phase of pressure contact position between the roller 26 of the rocker arm 24 and each of the control members 27 that have a common-profiled control surface to thereby change the lift of a corresponding valve, but the present invention is not limited thereto. Specifically, the valve actuating mechanisms 40A and 40B can change the phase of pressure contact position between the roller 26 of the rocker arm 24 and each of the control members 27 that have different-profiled control surfaces to thereby change the lift of a corresponding valve.

In this embodiment, the valve actuating mechanisms 40A and 40B configured in FIGS. 2 and 3 are used to activate the intake and exhaust valves, but other valve actuating mechanisms configured to be different from those illustrated in FIGS. 2 and 3 can be used to activate the intake and exhaust valves.

In this embodiment, with the cooling and recirculation system 50, the recirculation pipe 51 communicably connects between each intake tube of the intake manifold 41 and one exhaust tube of the exhaust manifold 42 corresponding to one cylinder 11, but the present invention is not limited thereto. Specifically, the recirculation pipe 51 can communicably connect between each intake tube of the intake manifold 41 and at least some exhaust tubes of the exhaust manifold 42. The engine 10 is not limited to the four-cylinder engine 10.

While illustrative embodiments of the present disclosure have been described herein, the present disclosure is not limited to the embodiment described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An internal combustion engine that configured to operate in a homogeneous-charge compression ignition mode in which a homogeneous charge of air-fuel mixture is compressed by a piston in a combustion chamber of a cylinder to start ignition, the internal combustion engine comprising:
   a fuel injector that configured to directly spray fuel into the combustion chamber;
   intake valves configured to be actuated to open or close openings of an intake port through which a gas intake passage communicates with the combustion chamber, respectively;
   exhaust valves configured to be actuated to open or close openings of an exhaust port through which a gas exhaust passage communicates with the combustion chamber, respectively;
   valve actuating mechanisms configured to be controlled to actuate the intake valves and the exhaust valves, respectively; and
   an exhaust gas cooling and recirculation system that includes:
      a recirculation passage communicably connected to the gas exhaust passage and the gas intake passage and configured for recirculating exhaust gas from the gas exhaust passage to the gas intake passage, bypassing the combustion chamber, and
      a cooler for cooling exhaust gas from the gas exhaust passage,
   wherein,
   the intake valves are provided as a pair of:
      a first intake valve configured to be actuated to open or close a first opening corresponding thereto among the openings of the intake port, and
      a second intake valve configured to be actuated to open or close a second opening corresponding thereto among the openings of the intake port, the exhaust valves are provided as a pair of:
      a first exhaust valve configured to be actuated to open or close a first opening corresponding thereto among the openings of the exhaust port, and
      a second exhaust valve configured to be actuate to open or close a second opening corresponding thereto among the openings of the exhaust port,
   the first intake valve and the first exhaust valve are arranged to be opposite to each other, the second intake valve and the second exhaust valve are arranged to be opposite to each other, the recirculation passage includes a joint to the gas intake passage, the joint being located in a position such that exhaust gas as cooled by the cooler and introduced from the recirculation passage through the joint into the recirculation passage is mixed with fresh air flowing in the gas intake passage toward the first intake valve, the valve actuating mechanisms are configured to be controllable to draw back high-temperature exhaust gas from the gas exhaust passage via the second exhaust valve into the combustion chamber, the valve actuating mechanisms are configured to be controllable during an intake stroke of the internal combustion engine operating in the homogenous-charge compression ignition mode, for actuating the first and second intake valves to open the first and second openings of the intake port, actuating the second exhaust valve to open the second opening of the exhaust port, whereby the combustion chamber is configured to have:

fresh air as mixed with cooled exhaust gas introduced thereto from the gas intake passage through the first opening of the intake port, fresh air introduced thereto from the gas intake passage through the second opening of the intake port, and high-temperature exhaust gas drawn back thereto from the gas exhaust passage through the second opening of the exhaust port, and wherein the combustion chamber is configured to produce, in the combustion chamber, a temperature distribution rectified with:

low-temperature mixtures including fresh air and cooled exhaust gas, and high-temperature mixtures including fresh air and high-temperature exhaust gas.

2. The internal combustion engine according to claim 1, wherein the exhaust gas cooling and recirculation system is configured to recirculate cooled exhaust gas via the recirculation passage while a parameter based on a request load for the internal combustion engine and a value of a speed of the internal combustion engine is located within a predetermined region in an operating range of the internal combustion engine.

3. The internal combustion engine according to claim 1, wherein the fuel injector is configured to directly spray fuel during the intake stroke of the internal combustion engine operating in the homogeneous-charge compression ignition mode.

4. The internal combustion engine according to claim 1, further comprising a partitioning wall that partitions the intake port and a part of the gas intake passage communicating therewith, the partitioning wall being located at least downstream of a position in the gas intake passage where cooled exhaust gas introduced from the exhaust gas cooling and recirculation system.

* * * * *